(12) United States Patent  (10) Patent No.: US 8,171,926 B2
Chang  (45) Date of Patent: May 8, 2012

(54) FIRE IGNITER OF CARBONACEOUS FUEL

(76) Inventor: Freddie Chang, Taichung (TW)

(*) Notice: Subject to any disclaimer, the term of this patent is extended or adjusted under 35 U.S.C. 154(b) by 385 days.

(21) Appl. No.: 12/118,634

(22) Filed: May 9, 2008

(65) Prior Publication Data

US 2008/0276926 A1  Nov. 13, 2008

(51) Int. Cl.
  *F24C 1/16*  (2006.01)
(52) U.S. Cl. .............. 126/9 R; 126/25 B; 126/152 R; 16/408; 16/409; 222/323; 222/325
(58) Field of Classification Search .......... 126/9 R, 126/25 B, 152 R; 16/408, 409
  See application file for complete search history.

(56) References Cited

U.S. PATENT DOCUMENTS

| | | | | |
|---|---|---|---|---|
| 963,769 A * | 7/1910 | Johnson et al. | ................ | 220/6 |
| 1,673,769 A * | 6/1928 | Graham | ................ | 220/6 |
| 1,972,483 A * | 9/1934 | Hartson | ................ | 220/6 |
| 2,244,935 A * | 6/1941 | Binger | ................ | 126/9 R |
| D131,229 S * | 1/1942 | Allen | ................ | D6/566 |
| 2,373,917 A * | 4/1945 | Ross | ................ | 215/228 |
| 3,296,984 A * | 1/1967 | Durfee | ................ | 126/25 B |
| 3,494,349 A * | 2/1970 | Allen | ................ | 126/25 B |
| 3,813,003 A * | 5/1974 | Bernazzani | ................ | 220/772 |
| D245,096 S * | 7/1977 | Heidelbach | ................ | D7/417 |
| D245,256 S * | 8/1977 | Heidelbach | ................ | D7/417 |
| 4,126,116 A * | 11/1978 | McCallum | ................ | 126/9 R |
| 4,455,992 A * | 6/1984 | Hsiao | ................ | 126/9 R |
| 4,508,094 A * | 4/1985 | Hait | ................ | 126/9 R |
| 4,545,359 A * | 10/1985 | Hait | ................ | 126/9 R |
| 4,714,013 A * | 12/1987 | Telfer | ................ | 99/449 |
| 4,794,906 A * | 1/1989 | Longley, Jr. | ................ | 126/9 R |
| 5,010,848 A * | 4/1991 | Rankin | ................ | 119/461 |
| D326,981 S * | 6/1992 | Balven | ................ | D7/402 |
| 5,230,325 A * | 7/1993 | Williams | ................ | 126/25 B |
| 5,299,704 A * | 4/1994 | Thorby | ................ | 220/6 |
| 5,469,835 A * | 11/1995 | Stephen et al. | ................ | 126/25 B |
| D366,392 S * | 1/1996 | Stephen et al. | ................ | D7/417 |
| 5,630,521 A * | 5/1997 | Waddell et al. | ................ | 190/18 A |
| 5,711,210 A * | 1/1998 | Kaufman | ................ | 99/340 |
| 5,785,046 A * | 7/1998 | Colla | ................ | 126/9 R |
| D459,945 S * | 7/2002 | Bodum | ................ | D7/417 |
| 6,533,086 B1 * | 3/2003 | Waddell et al. | ................ | 190/18 A |
| 6,581,245 B2 * | 6/2003 | Jen | ................ | 16/408 |
| D497,772 S * | 11/2004 | Bodum | ................ | D7/417 |
| 6,913,013 B1 * | 7/2005 | Mize | ................ | 126/25 B |
| 2002/0138948 A1 * | 10/2002 | Jen | ................ | 16/408 |
| 2003/0126721 A1 * | 7/2003 | Panek et al. | ................ | 16/409 |
| 2007/0056524 A1 * | 3/2007 | Barca | ................ | 119/496 |
| 2008/0230043 A1 * | 9/2008 | Bruno | ................ | 126/25 B |

* cited by examiner

*Primary Examiner* — Kenneth Rinehart
*Assistant Examiner* — Jorge Pereiro
(74) *Attorney, Agent, or Firm* — Michael N. Cohen; Cohen IP Law Group, PC (57) ABSTRACT

A fire igniter of carbonaceous fuel, especially the fire igniter providing an initial operation to ignite cold and raw carbonaceous fuel, includes a barrel unit, a space of which is deformable and is collected easily. The barrel unit includes primarily a front plate, a rear plate and a side wing that are connected by hinges, so as to be deformed and collapsed for reducing a volume to be collected.

15 Claims, 8 Drawing Sheets

FIRE IGNITER OF CARBONACEOUS FUEL

BACKGROUND OF THE INVENTION a) Field of the Invention

The present invention relates to a fire igniter of carbonaceous fuel, and more particularly to a barrel-shape fire igniter which provides an initial operation to ignite cold and raw carbonaceous fuel.

b) Description of the Prior Art

As the carbonaceous fuel can be carried safely for use in a cook-out, and ashes after burning can be used as fundamental elements of an organic fertilizer, most of the cook-outs or barbecues will use the carbonaceous fuel as a fire source, including coke, charcoal or plant coal formed by densification.

As a density of the carbonaceous fuel is close to that of wood or even the coke, and the carbonaceous fuel is in a grainy shape, fire cannot be ignited immediately due to a restriction of fire power of flares; hence, an ignition operation should be performed to a pile of carbonaceous fuel.

Figure 1:
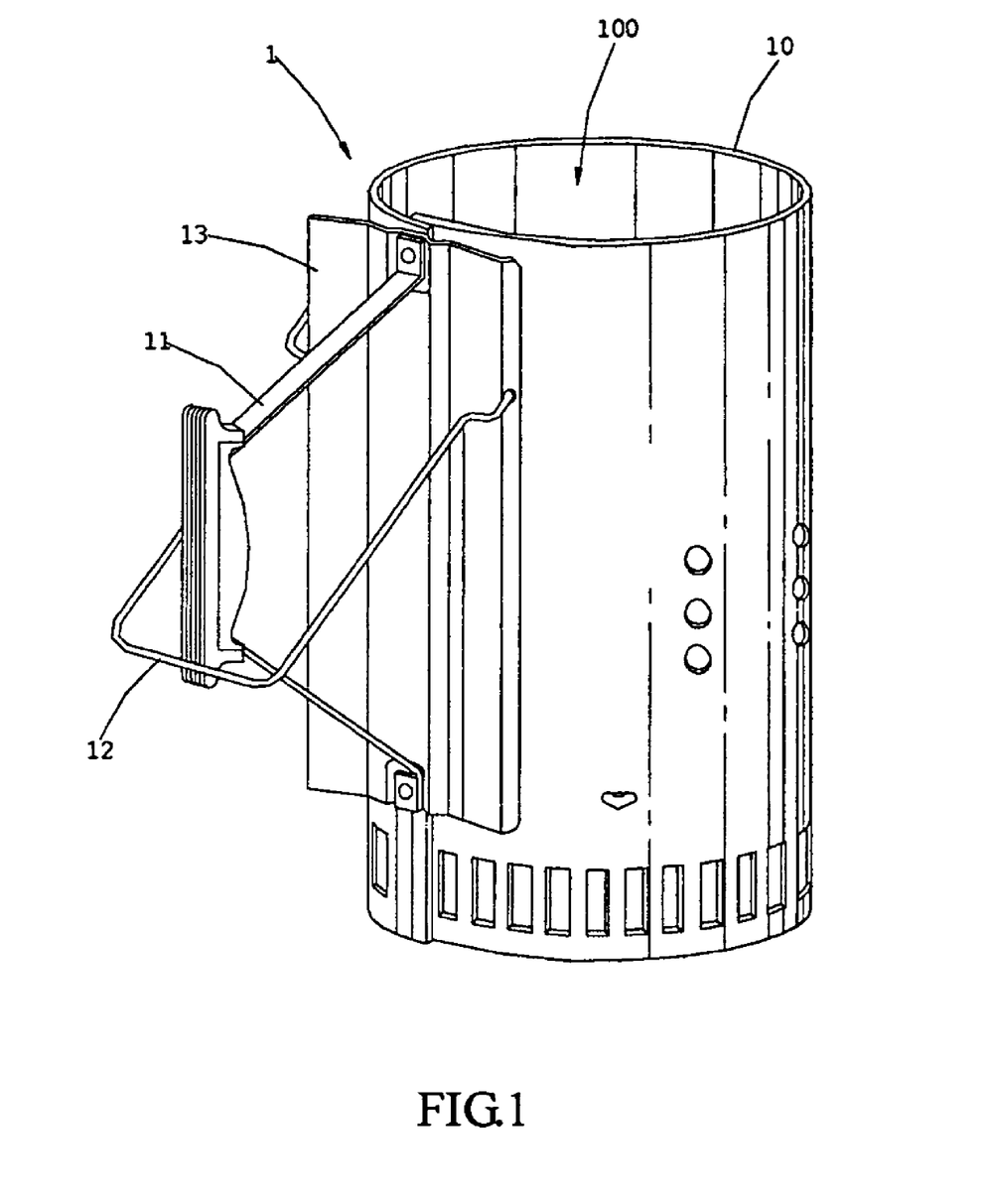
FIG. 1 shows a perspective view of a conventional fire igniter.

Referring to FIG. 1, it shows a perspective view of a conventional fire igniter, wherein a barrel-shape fire igniter 1 includes a barrel unit 10 which surrounds a fire chamber 100, and a side of which is connected with a handle 11 and an auxiliary handle 12 through a connection plate 13. After an interior of the fire chamber 100 is emplaced with the carbonaceous fuel, a kindling fire is made to ignite the fire within the fire chamber 100. By the barrel unit 10, a side wind and an unnecessary heat loss can be avoided, allowing flames after igniting the carbonaceous fuel at a bottom layer to attack toward the carbonaceous fuel stacked at upper layers, so as to achieve a complete pre-heating and ignition.

When most of the grainy carbonaceous fuel can be combusted by themselves, they are poured into a barbecue oven or a cook-out oven to carry out a thermal work. Due to that in a conventional design, the barrel unit 10 is a cylindrical barrel with a fixed cross section; hence, it is not collected easily when carrying. Furthermore, as the interior of the barrel unit 10 is dirty, other objects cannot be put in there. On the other hand, the handle is usually fixed; therefore, a rather large volume will be occupied in the carrying space.

SUMMARY OF THE INVENTION

Accordingly, a primary object of the present invention is to provide a fire igniter of carbonaceous fuel which can be deformed for collection and includes primarily a front plate, a side wing and a rear plate, with the front plate being able to be folded toward the rear plate, so as to largely reduce a collection space.

A second object of the present invention is to provide a fire igniter of carbonaceous fuel, wherein a handle can be folded reversely for collection through a connection method.

A third object of the present invention is to provide a fire igniter of carbonaceous fuel, wherein a grate which divides the carbonaceous fuel can be deformed to enlarge a bottom area, so as to facilitate igniting the fire.

A fourth object of the present invention is to provide a fire igniter of carbonaceous fuel, wherein a side wing is formed by connecting two foldable plates through hinges, and is collected inward.

A fifth object of the present invention is to provide a fire igniter of carbonaceous fuel, wherein the grate can be fastened by a latching element on a rear plate, so as to prevent the grate from dropping out when pouring the carbonaceous fuel.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 2:
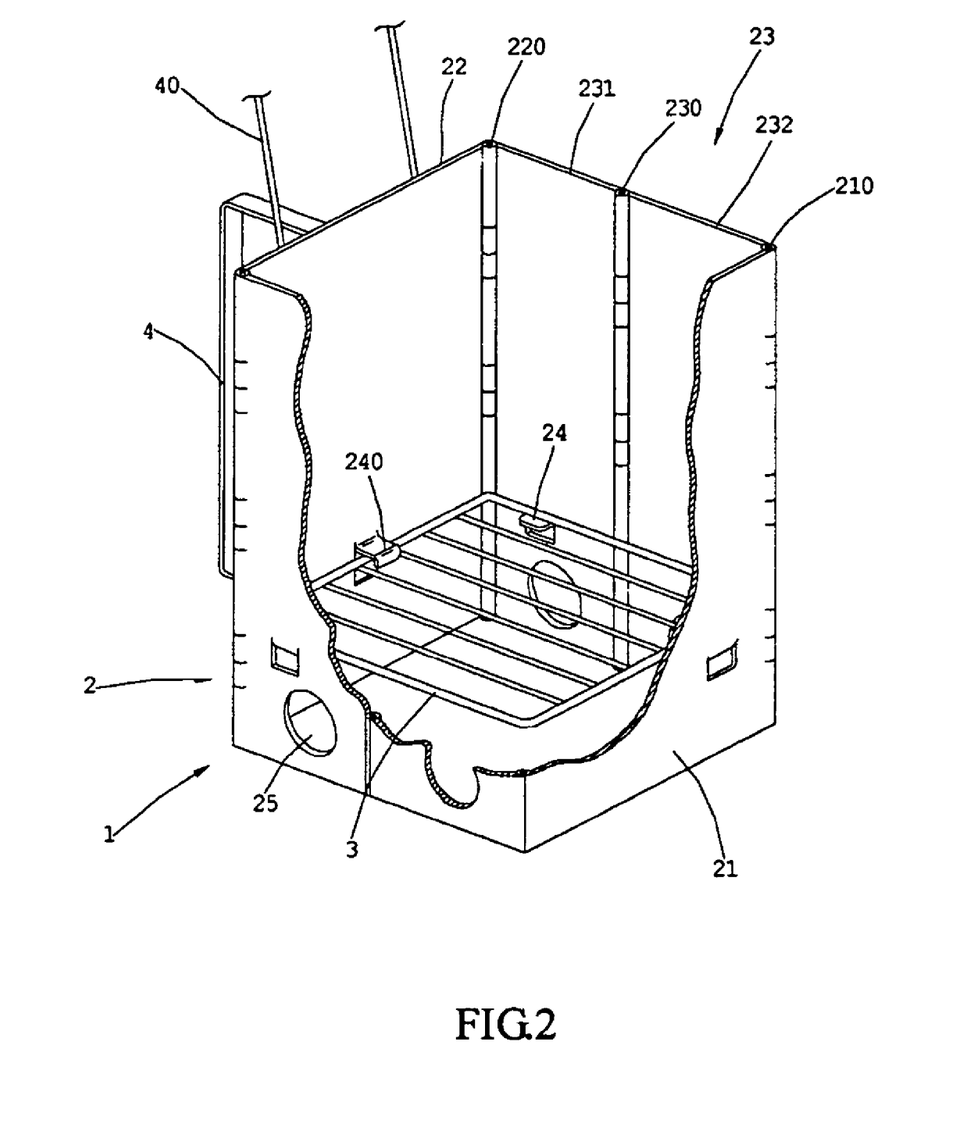
FIG. 2 shows a perspective view of the present invention.

Referring to FIG. 2, a fire igniter 1 of the present invention comprises a deformable barrel unit 1, a rear side of which is connected to a lifting handle 4 and an auxiliary handle 40 through a rear plate 22, allowing the barrel unit 1 to be carried and the carbonaceous fuel to be poured by two hands. The deformable barrel unit 2 comprises the rear plate 22 which is connected to a front plate 21 through a side wing 23, and the side wing 23 is formed by connecting two foldable plates 231, 232 with a butt hinge 230; whereas corners between the side wing 23 and the rear plate 22, and corners between the side wing 23 and the front plate 21, are connected with corner hinges 220. After unfolding the barrel unit 2, a grate 3 is placed across an interior of a waist part, and below the grate 3 is opened outward with an air intake 25 for replenishing needed oxygen.

The grate 3 can be further transversally placed across the interior of the waist part of the deformable barrel unit 2 with support elements 24 across which sides of the grate 3 are placed.

A side of the rear plate 22, at an upper rim of the grate 3, is provided with a latching element 240 for fastening the grate 3, such that when pouring the carbonaceous fuel, the grate 3 will not fall out. The latching element 240 can be further in a hook shape, and if the deformable barrel unit 2 is operated to result in an excessively large pouring angle, then the grate 3 will be formed as a swing condition without falling out, by being hooked with a hook part of the latching element 240.

Figure 3:
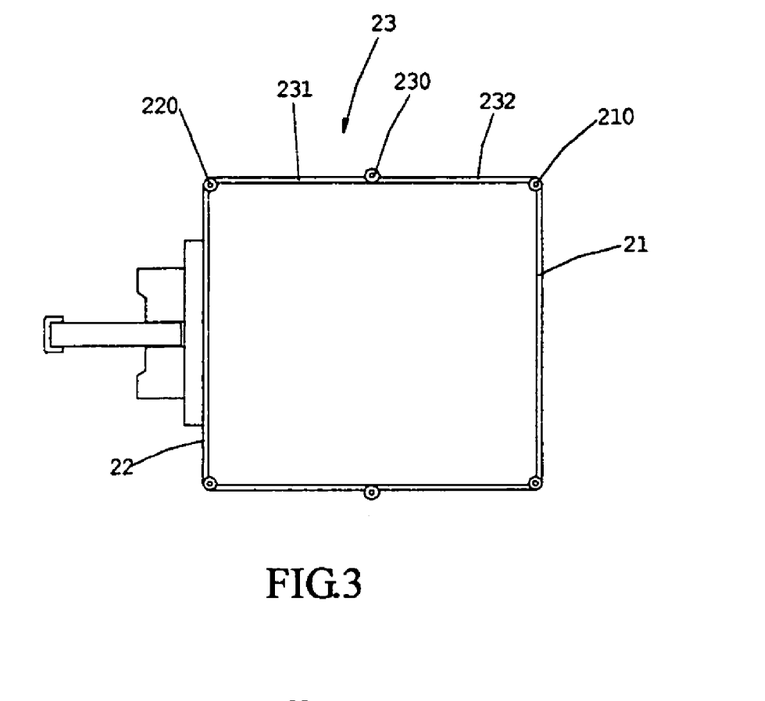
FIG. 3 shows a top view of the present invention which is unfolded.
Figure 4:
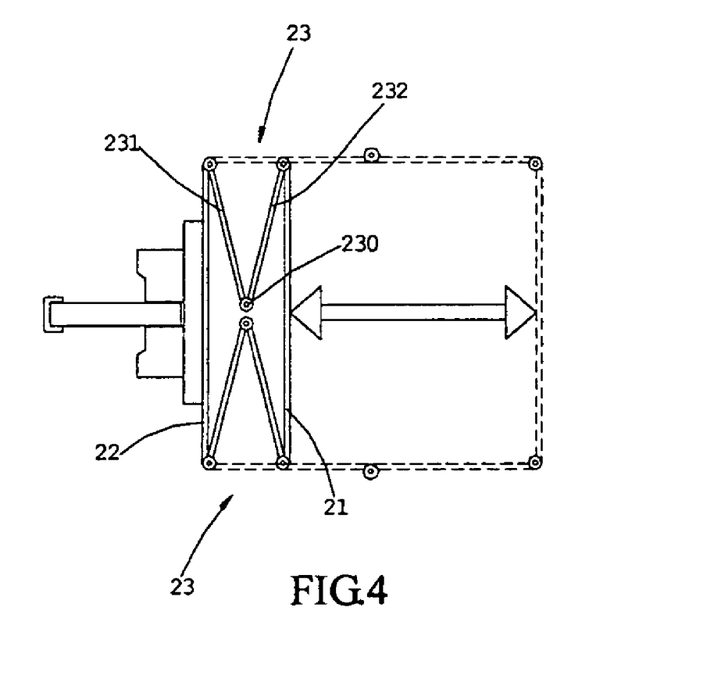
FIG. 4 shows a top view of the present invention which is folded.

Referring to FIG. 3, the rear plate 22 is connected with the front plate 21 with the side wing 23 which is formed by connecting the foldable plates 231, 232 with the butt hinge 230. The butt hinge 230 is located outside, and the corner hinges 210, 220 which join the side wing 23 with the front plate 21 and the rear plate 22 are located at inner sides of the corners. Therefore, in a collection process, the foldable plates 231, 232 will be collapsed toward an inner space. Referring to FIG. 4, the butt hinge 230 for the foldable plates 231, 232 is indented toward the inner space, forming a linking rod operation which allows the front plate 21 to be indented with respect to the rear plate 22, thereby achieving an object of shrinking a volume to facilitate carrying and collecting.

Figure 5:
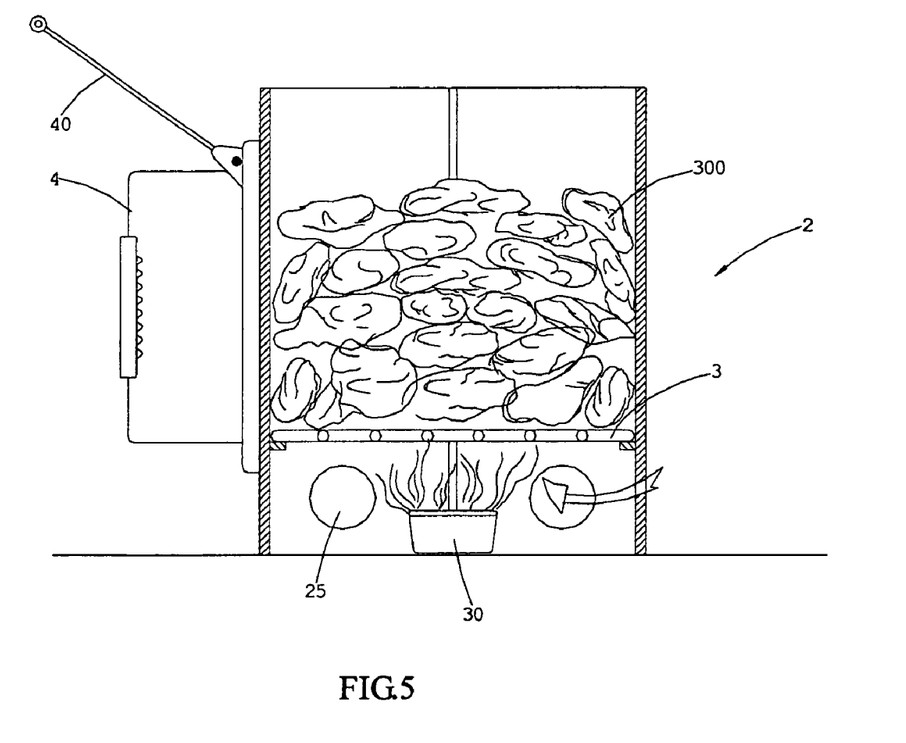
FIG. 5 shows a schematic view of the present invention which is used for igniting fire.

Referring to FIG. 5, it shows a schematic view of an ignition operation. After unfolding the deformable barrel unit 2, an interior of the barrel unit 2 is placed with carbonaceous fuel 300 in stacks. By a division of the grate 3, kindling fire 30 can attack from below and pass through spaces divided by the grate 3, allowing flames to attack toward a bottom of the carbonaceous fuel 300. After the carbonaceous fuel 300 at a bottom layer is ignited, and when fire power attacks toward the carbonaceous fuel 300 above, an entire surface of the carbonaceous fuel 300 will be burning to achieve a self-combustion state. When a part or most part of the carbonaceous fuel 300 is self-combusted, the carbonaceous fuel 300 can be poured out by operating the lifting handle 4 and the auxiliary handle 40. On the other hand, the oxygen needed for ignition is fed in through the air intake 25.

Figure 6:
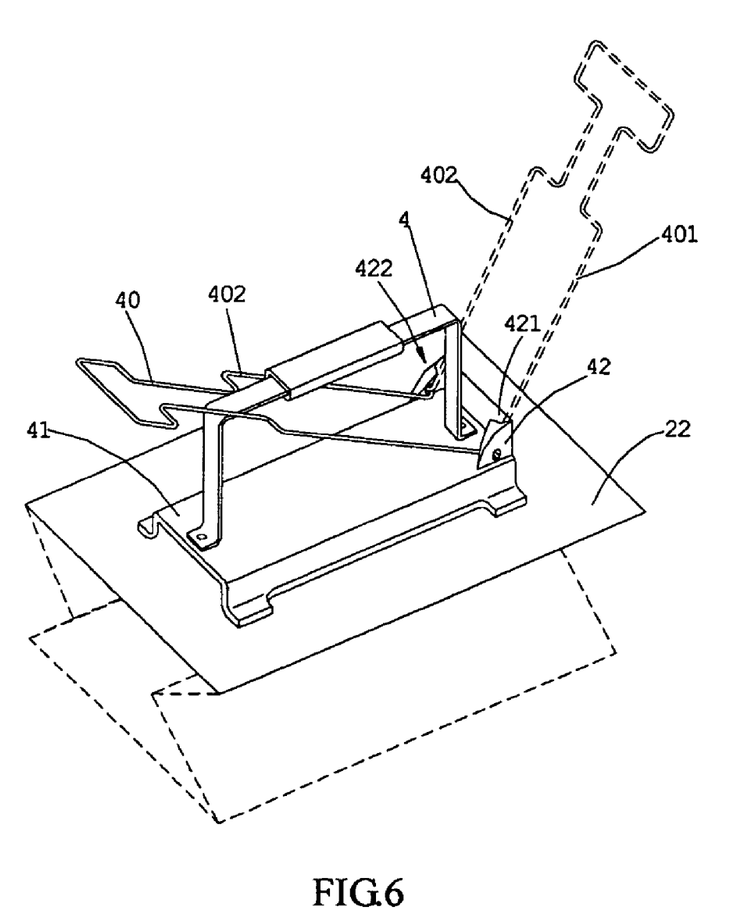
FIG. 6 shows a schematic view of the present invention upon assembling a handle.

Referring to FIG. 6, the lifting handle 4 is provided at an exterior side of the rear plate 22, and is connected to the rear plate 22 by a cross-over bracket 41. An end of the cross-over bracket 41 is provided with a connection seat 42 for connecting the auxiliary handle 40, and a rod body 401 of the auxiliary handle 40 is fastened by a notch 421 of the connection seat 42. Therefore, when the auxiliary handle 40 is opened to a maximum angle, its rod body 401, 402 will be latched in the notch 421, 422 due to an elastic deformation effect, thereby achieving a fixing function and facilitating to acquire an efficient direction for exerting force upon operating.

Figure 7:
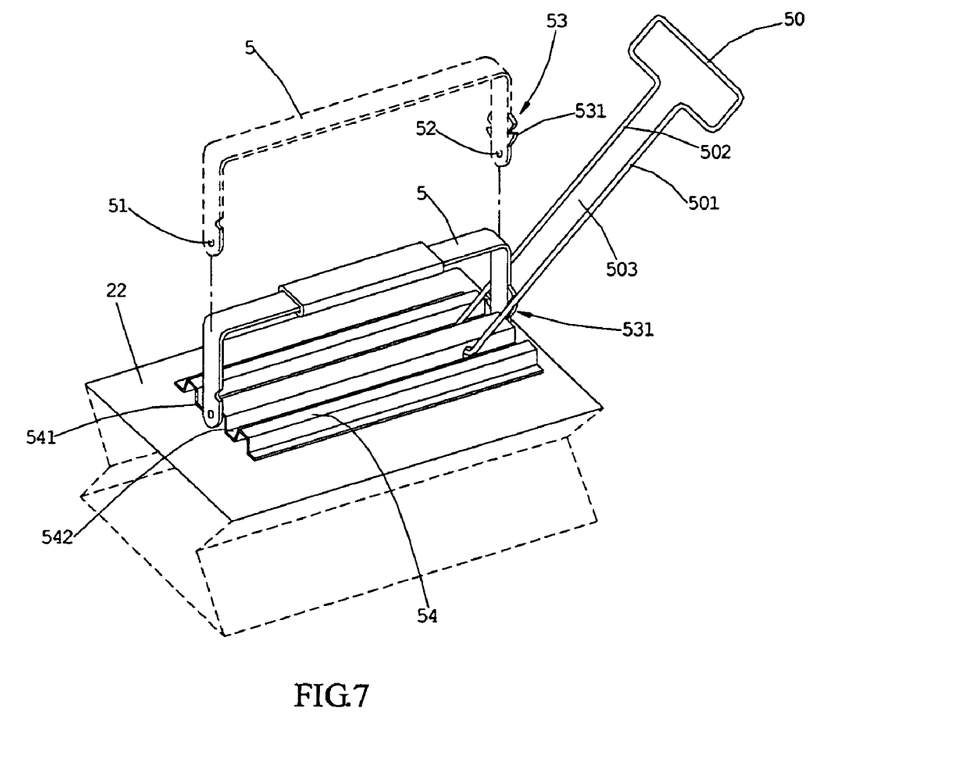
FIG. 7 shows a further schematic view of the present invention upon collecting a handle.

Referring to FIG. 7, in a further embodiment of the present invention, the handle can be collected, wherein a wavy cross-over bracket 54 is used to connect a U-shape foldable handle 5, and U-shape side ends of the foldable handle 5 are provided respectively with a pivot hole 51, 52, such that the foldable handle 5 can be connected to corresponding sides of the cross-over bracket 54. In addition, a turnable auxiliary handle 50 is connected at inner sides of the cross-over bracket 54 over which the foldable handle 5 is across, and an inner space 503 between rod bodies 501, 502 of the auxiliary handle 50 is wider than a width of the foldable handle 5. If the auxiliary handle 50 is folded backward, then the rod bodies 501, 502 will be placed in grooves 541, 542 of the wavy cross-over bracket 54. On the other hand, when the auxiliary handle 50 is flipped to an operation angle, it will be crossed obliquely over corresponding sides of the foldable handle 5, with a cross point being able to position the foldable handle 5 vertically.

A positioning element 53 is provided on a corresponding rod body of the foldable handle 5 at the cross point, and is provided with indented notches 531 for fastening the rod bodies 501, 502 of the auxiliary handle 50 to facilitate the positioning that allows the foldable handle 5 to be perpendicular to the rear plate 22, and allows the auxiliary handle 50 to be positioned at an opened angle.

Figure 8:
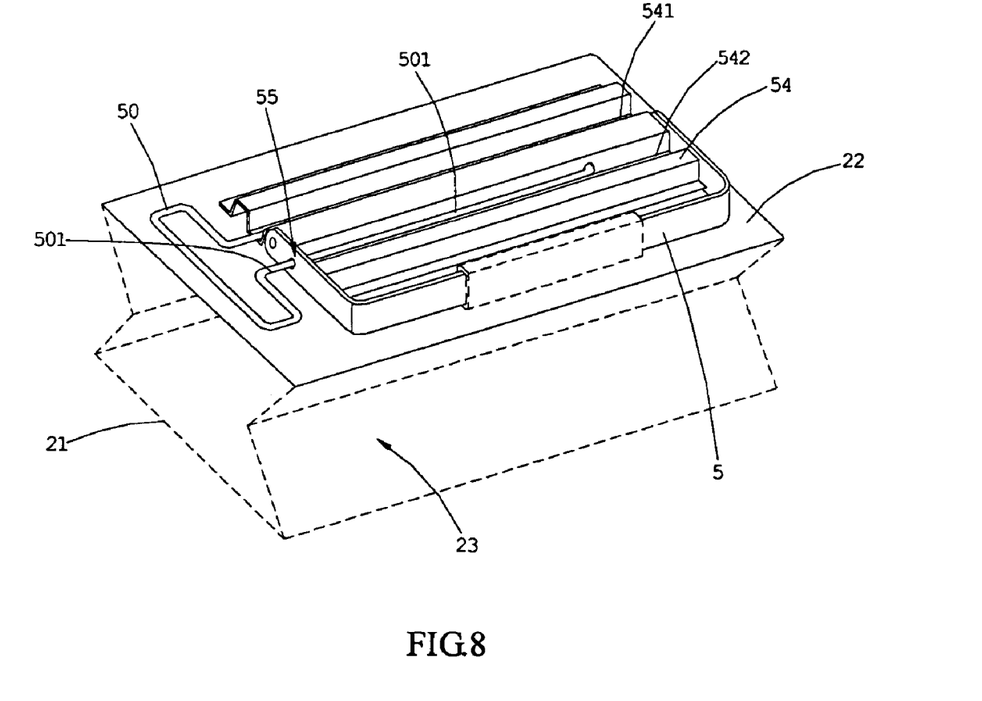
FIG. 8 shows a schematic view of collection of FIG. 7.

Referring to FIG. 8, the auxiliary handle 50 is first collected into the grooves 541, 542 of the wavy cross-over bracket 54, and the foldable handle 5 can be folded by itself to be collected toward the rear plate 22, wherein a notch 55 is provided at a position of the foldable handle 5, corresponding to the rod body 501 of the auxiliary handle 50, allowing the foldable handle 5 to be placed flat on the rear plate 22.

Figure 9:
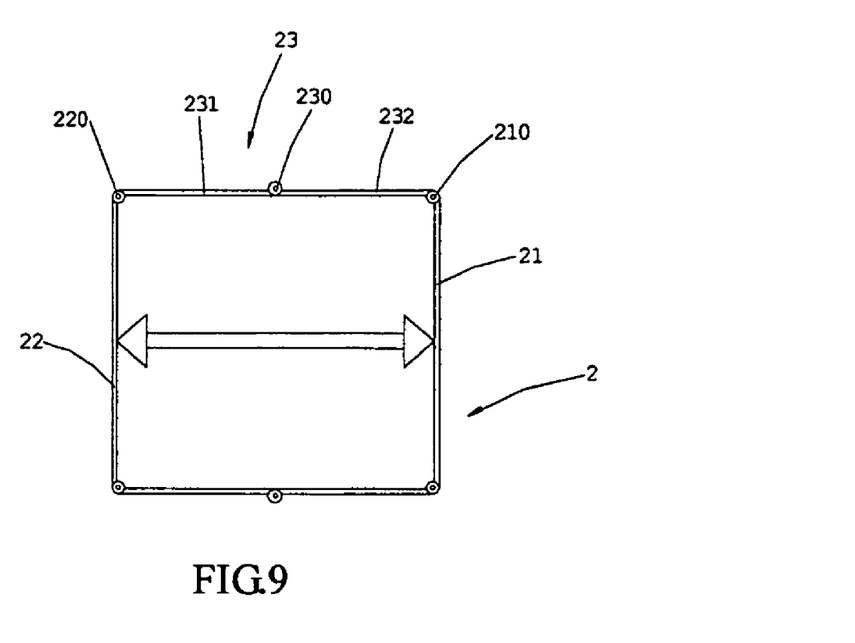
FIG. 9 shows a top view of a barrel unit of the present invention, with the barrel unit being unfolded.

Referring to FIG. 9, the deformable barrel unit 2 is formed by the front plate 21 and the rear plate 22 that are connected with the side wing 23 through the corner hinges 220, 210; whereas, the side wing 23 is formed by connecting the foldable plates 231, 232 through the butt hinge 230. After unfolding the deformable barrel unit 2, a stretching effect will be formed between the front plate 21 and the rear plate 22 through the side wing 23.

Figure 10:
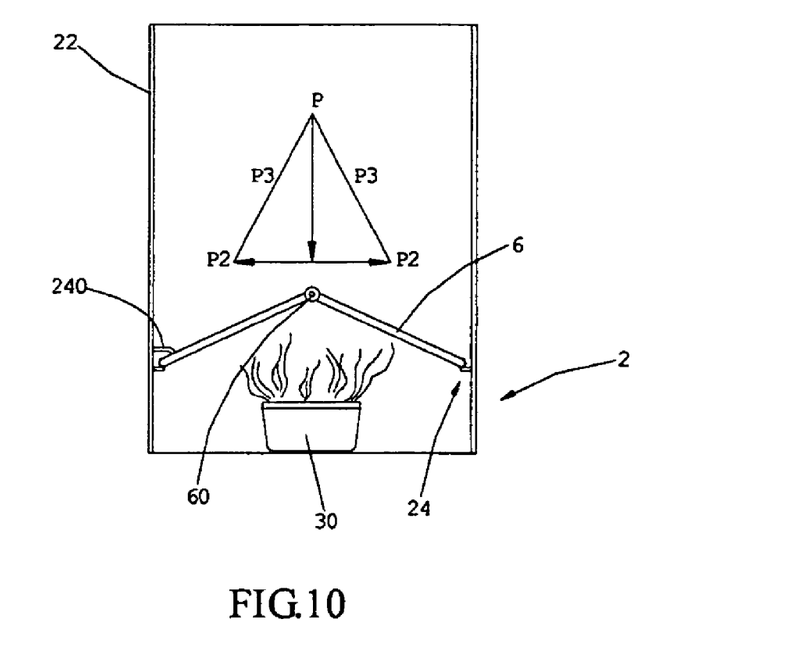
FIG. 10 shows a schematic view of the present invention upon using a deformable grate.

Referring to FIG. 10, a deformable grate 6 is formed as a foldable shape by using a cross hinge 60 which is connected at a center of a breadth surface of the deformable grate 6. As a maximum length of the deformable grate 6 after deformation is greater than a pitch of the barrel unit 2 after being unfolded, the deformable grate 6 will be formed as a sharp cone surface like a roof top, after being placed into the barrel unit 2 and pushed by the support elements 24. By the oblique cone surface, a contact area at the bottom for receiving the kindling fire 30 will be enlarged, so as to accelerate combustion and expand the area in contact with oxygen. A side of the deformable grate 6 with respect to the rear plate 22 can be also hooked by the latching element 240 to prevent from falling out upon pouring the carbonaceous fuel. The deformable grate 6 is in a pike shape and a pressure P will be formed when the deformable grate 6 is loaded by filling in the aforementioned carbonaceous fuel. As an oblique force P3 will be formed by a combination of the pressure P and a horizontal force P2, the deformable grate 6 will be pressed and secured. On the other hand, a larger supportive force can be also formed by the deformable grate 6; therefore, the deformable grate 6 can be made by a wiring material of a smaller diameter, so as to save the material and facilitate collection.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A fire igniter of carbonaceous fuel, especially the fire igniter which provides an initial operation to ignite cold and raw carbonaceous fuel, comprising a deformable barrel unit which is formed by a front plate and a rear plate that are connected with a side wing through corner hinges, with the side wing being formed by two foldable plates that are connected through a butt hinge; an air intake which is provided below the barrel unit; a lifting handle which is provided at an exterior side of the rear plate; a movable grate which is transversally and movably provided inside a waist part of the barrel unit; a position of the rear plate, corresponding to the grate, is provided with a hook shaped latching element for fastening an upper rim of the grate; and said grate capable of a swing condition without falling out when the deformable barrel unit is operated to result in an excessively large pouring angel.

2. The fire igniter of carbonaceous fuel according to claim 1, wherein the corner hinges which connect the front plate and the rear plate with the side wing are provided at inner sides of the corners.

3. The fire igniter of carbonaceous fuel according to claim 1, wherein the butt hinge for the foldable plates of the side wing is provided at an exterior side.

4. The fire igniter of carbonaceous fuel according to claim 1, wherein the interior of the waist part of the barrel unit is provided with support elements over which the grate is crossed.

5. The fire igniter of carbonaceous fuel according to claim 1, wherein a center of a breadth surface of the grate is provided with a cross hinge, so as to form a deformable grate.

6. The fire igniter of carbonaceous fuel according to claim 5, wherein a dimension of a longest side of the deformable grate after deformation is greater than a pitch of the waist part of the barrel unit, and the deformable grate is formed as a pike shape after crossing over the barrel unit.

7. The fire igniter of carbonaceous fuel according to claim 5, wherein a side of the rear plate, corresponding to the deformable grate, is provided with a latching element.

8. A fire igniter of carbonaceous fuel, especially being provided with a handle which is foldable to be collected, comprising a barrel unit which is provided with a rear plate, with a cross-over bracket being provided at an exterior side of the rear plate; two ends of a foldable handle being connected at two sides of the cross-over bracket, and a foldable auxiliary handle being connected at inner sides of the cross-over bracket over which the foldable handle is crossed; wherein after folding up the foldable handle, the foldable handle is crossed over an inner space of the auxiliary handle; and a positioning element provided on a corresponding rod body of the foldable handle at a cross point with respect to the auxiliary handle.

9. The fire igniter of carbonaceous fuel according to claim 8, wherein the auxiliary handle is provided at grooves of the cross-over bracket after being folded.

10. The fire igniter of carbonaceous fuel according to claim 8, wherein the barrel unit is deformable and is constituted by the front plate which is connected with the rear plate through the side wing, with corner positions being connected by corner hinges, and the side wing being formed by connecting two foldable plates through a butt hinge, an air intake being provided below the barrel unit, and a movable grate being transversally and movably provided inside a waist part of the barrel unit.

11. The fire igniter of carbonaceous fuel according to claim 10, wherein the interior of the waist part of the barrel unit is provided with support elements over which the grate is crossed.

12. The fire igniter of carbonaceous fuel according to claim 10, wherein a position of the rear plate, corresponding to the grate, is provided with a latching element for fastening an upper rim of the grate.

13. The fire igniter of carbonaceous fuel according to claim 12, wherein the latching element is in a hook shape.

14. The fire igniter of carbonaceous fuel according to claim 10, wherein a center of a breadth surface of the grate is provided with a cross hinge, so as to form a deformable grate.

15. The fire igniter of carbonaceous fuel according to claim 14, wherein a dimension of a longest side of the deformable grate after deformation is greater than a pitch of the waist part of the barrel unit, and the deformable grate is formed as a pike shape after crossing over the barrel unit.

* * * * *